No. 48,434.  
T. H. POWERS.  
BROOM HEAD.  
PATENTED JUNE 27, 1865.

WITNESSES:  
INVENTOR:

UNITED STATES PATENT OFFICE.

THOS. H. POWERS, OF MILWAUKEE, WISCONSIN.

IMPROVED BROOM-HEAD.

Specification forming part of Letters Patent No. 48,434, dated June 27, 1865.

*To all whom it may concern:*

Be it known that I, THOMAS HART POWERS, of Milwaukee, in the county of Milwaukee and State of Wisconsin, have invented new and useful Improvements in Brooms; and I do hereby declare that the following is a full, clear, and exact description thereof, which will enable others skilled in the art to make and use the same, reference being had to the accompanying drawings, forming part of this specification.

The present invention relates more particularly to certain new and useful improvements in the mode of securing the broom to its handle, heretofore invented and patented by me on the 13th day of May, A. D. 1856, and herein will be described with reference thereto, it consisting, first, in forming the open end of the conical socket used therein with a flange-shaped edge, whereby a closer joint is made with the broom inserted therein; and, second, in the use of a D-shaped nut having its edges serrated or notched in any proper manner, between which and the flanged-edge cone the broom is placed, as will be hereinafter described, the principal advantage of which is that a more firm and better holding of the broom is secured.

Figure 1:
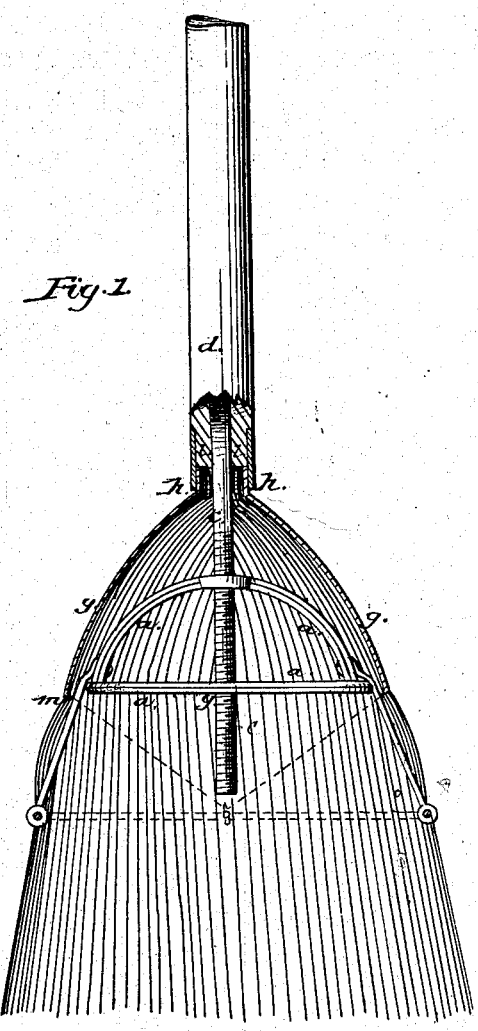
Figure 2:
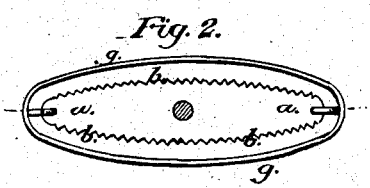

In accompanying plate of drawings my improvements are represented, Figure 1 being a central sectional view of the conical socket, showing the broom and holding-nut in side view, and Fig. 2 a view of the open end of the conical socket, with its nut, the broom portion being detached therefrom.

The broom is made of the ordinary broom-corn or of any of the other materials generally used for the purpose, which is placed around and over the D-shaped nut $a$, having its edges serrated or notched with a series of teeth, $b\ b\ b$; of any desired number and size, and screwing upon, with its straight side $f$ at right angles thereto, the fixed screw-shaft $c$ of the handle $d$ for the broom, which handle may be made of any size and shape, as well as any material suitable therefor.

$g$ is a flat conical-shaped socket-plate, placed over the screw-shaft $c$ by its smaller end $h$, which tightly fits upon the end $l$ of the handle, and has its larger or open end $m$ made with a flanged edge, $n$, for the entire length of its periphery. Between this cone and the D-shaped nut or follower the broom-corn placed around and upon the latter, as described, is held, the shaft $c$ being screwed into the nut by turning the handle of the broom sufficiently to bring the nut to the proper position with regard to the conical socket-plate $g$ to tightly bind the broom-corn between them, when the corn is still further held by binding around and upon the same a series of rods and links connected with the nut, and arranged as described by me in the schedule annexed to and forming a part of the aforesaid Letters Patent.

By making the nut of the shape described it is apparent that a more secure and tight hold is obtained for the broom-corn, and that, furthermore, the flanged edge of the exterior cone-plate enables a perfectly close joint to be made with the broom-corn, the advantages of which are apparent to all.

Although I have described my improvements with reference to the patent heretofore granted to me, I do not intend to limit myself to any one particular application thereof, as it is evident that they can be applied to various styles of brooms or brushes, and either in combination with each other or separate, according as may be desired.

I claim as new and desire to secure by Letters Patent—

1. Forming the edge of the conical or other suitable socket-plate in and by which the upper portion of the broom-corn is held of a flange shape, substantially as herein described, and for the purpose specified.

2. The D-shaped nut, having its edges serrated or toothed, and arranged substantially as set forth, and for the purpose specified.

THOS. HART POWERS.

Witnesses:
 GEORGE W. LAKIN,
 GEO. P. GIFFORD.